(12) United States Patent
Branson, III et al.

(10) Patent No.: US 7,371,004 B1
(45) Date of Patent: May 13, 2008

(54) TRAVEL MUG CONFIGURED TO BLEND FOOD AND METHOD THEREOF

(75) Inventors: Benjamin Henry Branson, III, Mechanicsville, VA (US); Mark K. Romandy, Midlothian, VA (US)

(73) Assignee: Hamilton Beach Brands, Inc., Glen Allen, VA (US)

(*) Notice: Subject to any disclaimer, the term of this patent is extended or adjusted under 35 U.S.C. 154(b) by 0 days.

(21) Appl. No.: 11/684,040

(22) Filed: Mar. 9, 2007

(51) Int. Cl.
*A47J 43/046* (2006.01)

(52) U.S. Cl. ........................ 366/130; 366/205

(58) Field of Classification Search ................ 366/130, 366/199, 205–206, 314; 215/DIG. 7, DIG. 8; 426/519; 99/348; 220/568
See application file for complete search history.

(56) References Cited

U.S. PATENT DOCUMENTS

| | | | |
|---|---|---|---|
| 2,530,455 A * | 11/1950 | Forss ...................... | 241/282.2 |
| 3,881,705 A | 5/1975 | Greenspan | |
| 4,435,084 A * | 3/1984 | Calhoun et al. ............ | 366/130 |
| 4,487,509 A | 12/1984 | Boyce | |
| D327,818 S | 7/1992 | Haralson et al. | |
| 5,425,579 A * | 6/1995 | Sampson .................... | 366/130 |
| D377,293 S | 1/1997 | Husted | |
| 5,639,161 A * | 6/1997 | Sirianni ...................... | 366/314 |
| 5,692,830 A * | 12/1997 | Costanzo .................... | 366/314 |
| 5,720,552 A * | 2/1998 | Schindlegger .............. | 366/197 |
| 5,855,431 A * | 1/1999 | Costanzo .................... | 366/199 |
| 5,911,504 A * | 6/1999 | Schindlegger, Jr. ......... | 366/197 |
| D432,865 S | 10/2000 | Cohen | |
| 6,210,033 B1 | 4/2001 | Karkos, Jr. et al. | |
| 6,338,569 B1 | 1/2002 | McGill | |
| D454,756 S | 3/2002 | Janky et al. | |
| D457,035 S | 5/2002 | Hurlbut | |
| 6,450,363 B1 | 9/2002 | Lin | |
| D467,122 S | 12/2002 | Janky | |
| 6,511,031 B2 | 1/2003 | Lin | |
| 6,609,821 B2 | 8/2003 | Wulf et al. | |
| 6,616,323 B2 | 9/2003 | McGill | |
| D484,743 S | 1/2004 | Furlong | |
| 6,758,592 B2 | 7/2004 | Wulf et al. | |
| 6,854,875 B2 | 2/2005 | McGill | |

(Continued)

FOREIGN PATENT DOCUMENTS

WO    WO 03003888 A1 *    1/2003

(Continued)

*Primary Examiner*—Charles E. Cooley
(74) *Attorney, Agent, or Firm*—Panitch Schwarze Belisario & Nadel LLP

(57) ABSTRACT

A travel mug that is configured to blend food and adapted for being transported with a user in a drinking configuration and for mounting to a blender for blending food therein in a blending configuration. The mug includes a cup body having an open top, an open bottom and a cavity therein. A drinking cap is removably mounted to the top of the cup body. The drinking cap includes a drinking hole and a closure movable between a sealing position wherein the closure seals the drinking hole and an open position where the closure is spaced from the drinking hole. A blade fitting, having a blending blade, is removably mounted to the bottom of the cup body when the travel mug is in the blending configuration. Further, a bottom closure is removably mounted to the bottom of the cup body when the travel mug is in the drinking configuration.

8 Claims, 7 Drawing Sheets

U.S. PATENT DOCUMENTS

| | | |
|---|---|---|
| 7,066,640 B2 | 6/2006 | Sands |
| 2001/0036124 A1 | 11/2001 | Rubenstein |
| 2002/0127307 A1 | 9/2002 | McGill |
| 2004/0114457 A1 | 6/2004 | McGill |
| 2005/0105387 A1 | 5/2005 | Nikkhah |
| 2005/0184078 A1 | 8/2005 | Oas |
| 2006/0028911 A1 | 2/2006 | McGill |
| 2006/0126431 A1* | 6/2006 | Bhavnani .................... 366/314 |
| 2006/0175331 A1 | 8/2006 | Lin et al. |
| 2006/0176770 A1 | 8/2006 | Sands |

FOREIGN PATENT DOCUMENTS

WO    WO 2006117444 A1 * 11/2006

* cited by examiner

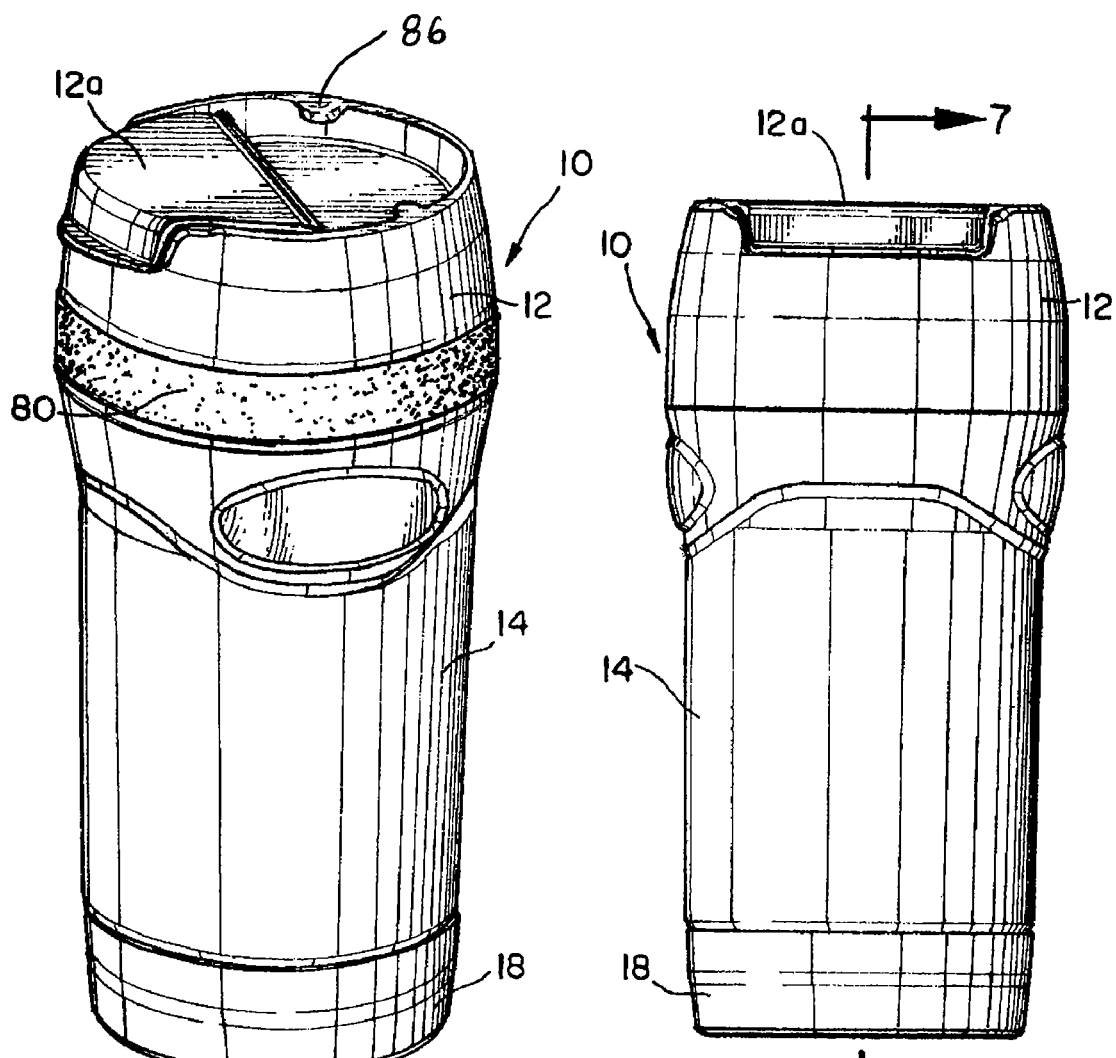
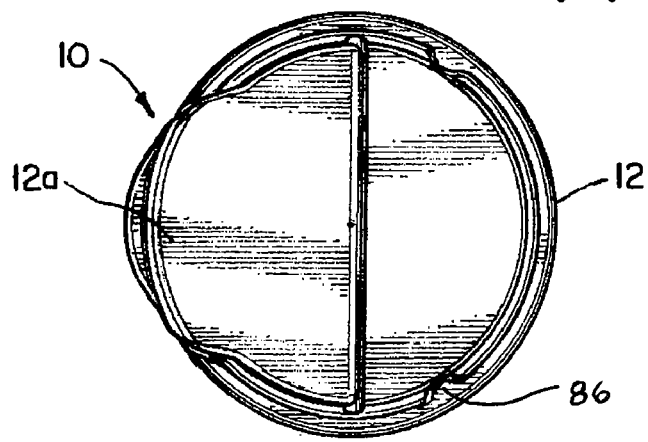

TRAVEL MUG CONFIGURED TO BLEND FOOD AND METHOD THEREOF

BACKGROUND OF THE INVENTION

The present invention is directed to a travel mug configured to blend food and a method thereof and, more particularly, to a travel mug or a travel mug blender that is capable of being transported with the user and for mounting to a conventional kitchen or household blender for blending food therein.

Travel mugs or beverage containers, particularly personal hot beverage cups for coffee or hot chocolate and personal cold beverage cups for smoothies, are well known in the art. Such mugs or cups are usually well insulated and allow a user to drink or sip the hot or cold beverage while the user is traveling or on the go. Typically, a user will blend the beverage or smoothie at home, pour the contents from the blender into the travel mug or cup and head out the door to begin the day. A typical travel mug includes a cup body having an open top, a closed bottom, a cavity therein and a removable cap enclosing the open top of the cup body.

Problems arise for the user later in the day when the blended beverage, food or smoothie, within the mug begins to settle toward the bottom of the cup body and the drink is no longer properly mixed to the user's taste preferences. When the user begins to drink the blended food beverage or smoothie later in the afternoon, the taste of the blended food or beverage is usually not desired or a taste that is expected by the user. It would be desirable to provide a travel mug that is adapted for being transported with a user as typical travel mugs or cups are and for mounting to a conventional blender for blending food or beverages therein. Such a travel mug or cup that attaches to a conventional blender would allow a user to create blended food or a blended drink directly within the travel mug or cup. Also, a user would have the capability of remixing or stirring the contents within the travel mug without the need to remove the food or beverage from the cup body.

Further, when transferring blended food or a blended drink from a typical blender into a travel mug or cup, the blended food stuff can create quite a mess if a user is not careful to slowly pour the blended contents into the travel mug. Therefore, it would be desirable to create a travel mug that is adapted for mounting to a conventional blender for blending food stuff directly within the travel mug to prevent the blended food stuff from creating a mess on the exterior of the travel mug.

BRIEF SUMMARY OF THE INVENTION

Briefly stated, the present invention is directed to a travel mug configured to blend food. The travel mug is adapted for being transported with a user in a drinking configuration and for mounting to a blender for blending food therein in a blending configuration. The mug includes a cup body having an open top, an open bottom and a cavity therein. A drinking cap is removably mounted to the top of the cup body. The drinking cap includes a drinking hole and a closure movable between a sealing position wherein the closure seals the drinking hole and an open position where the closure is spaced from the drinking hole. A blade fitting is removably mounted to the bottom of the cup body when the travel mug is in the blending configuration. The blade fitting includes a blending blade extending into the cavity when the blade fitting is mounted to the cup body in the blending configuration. Further, a bottom closure is removably mounted to the bottom of the cup body when the travel mug is in the drinking configuration.

In another aspect, the present invention is directed to a method of blending food using a travel mug. The method includes the steps of: providing a travel mug, including a cup body having an open top, an open bottom and a cavity therein; removably mounting a blade fitting, having a blending blade, to the bottom of the cup body; inserting food through the open top and into the cavity of the cup body; removably engaging a drinking cap, having a sealable drinking hole, to the top of the cup body; positioning the travel mug onto a blender such that the blending blade operatively engages the blender; activating the blender to blend the food and removing the travel mug from the blender; inverting the travel mug and removing the blade fitting from the bottom of the cup body; removably engaging a bottom closure to the bottom of the cup body; inverting the travel mug and unsealing the drinking hole so that blended food can be consumed.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purpose of illustrating the invention described in the present application, there is shown in the drawings, an embodiment which is presently preferred. It should be understood, however, that the invention is not limited to the precise arrangements and instrumentalities shown. In the drawings:

FIG. 1 is a perspective view of a preferred embodiment of a travel mug configured to blend food in accordance with the present invention;

FIG. 2 is a front elevation view of the travel mug shown in FIG. 1;

FIG. 5 is a top plan view of the travel mug shown in FIG. 1;

DETAILED DESCRIPTION OF THE INVENTION

Figures 3, 4:
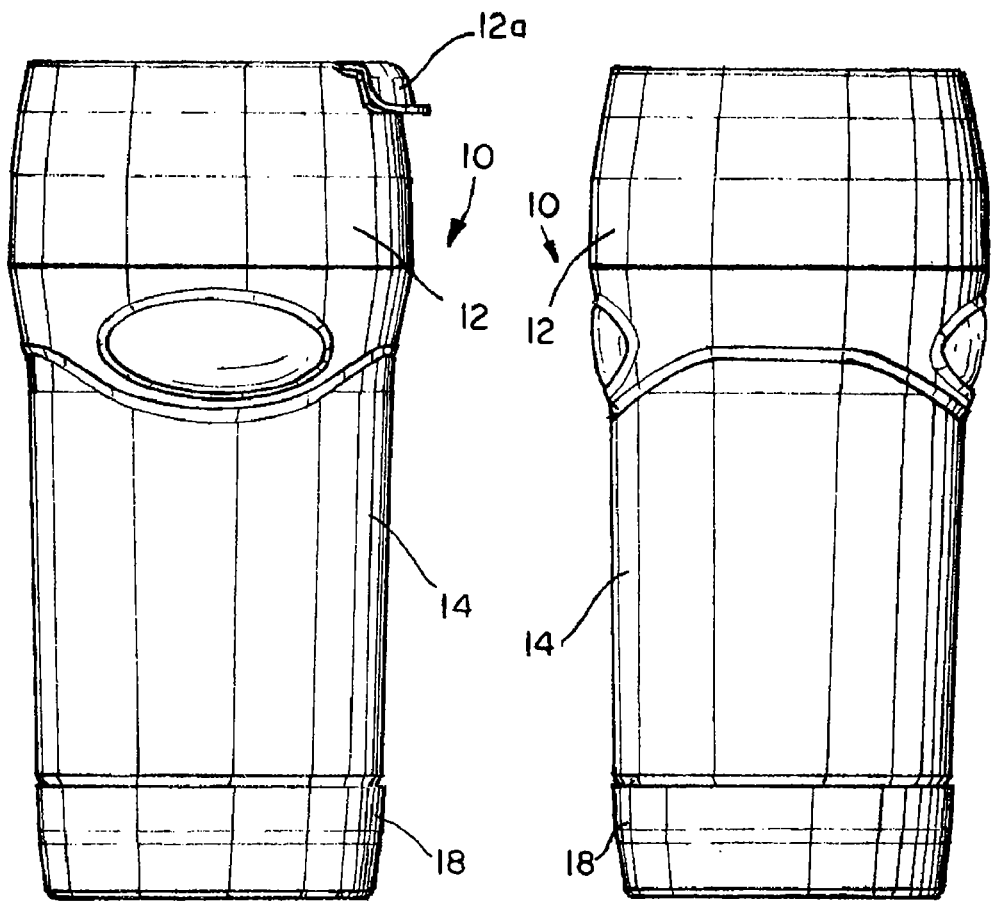
FIG. 3 is a left side elevation view of the travel mug shown in FIG. 1, with the right side being a mirror image.
FIG. 4 is a rear elevation view of the travel mug shown in FIG. 1.
Figure 6:
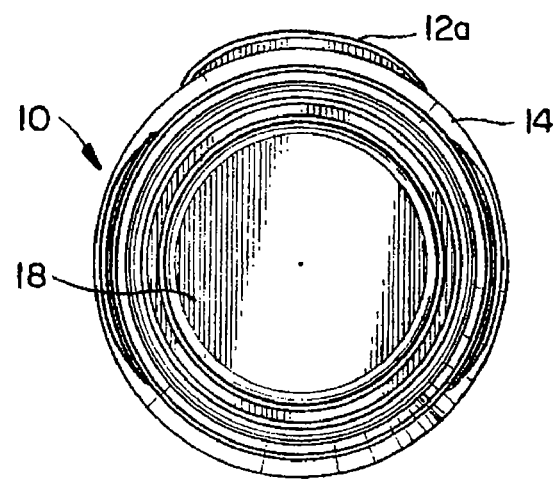
FIG. 6 is a bottom plan view of the travel mug shown in FIG. 1.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the dispensing blender and designated parts thereof. The terminology includes the above-listed words, derivatives thereof and words of similar import.

Figure 7:
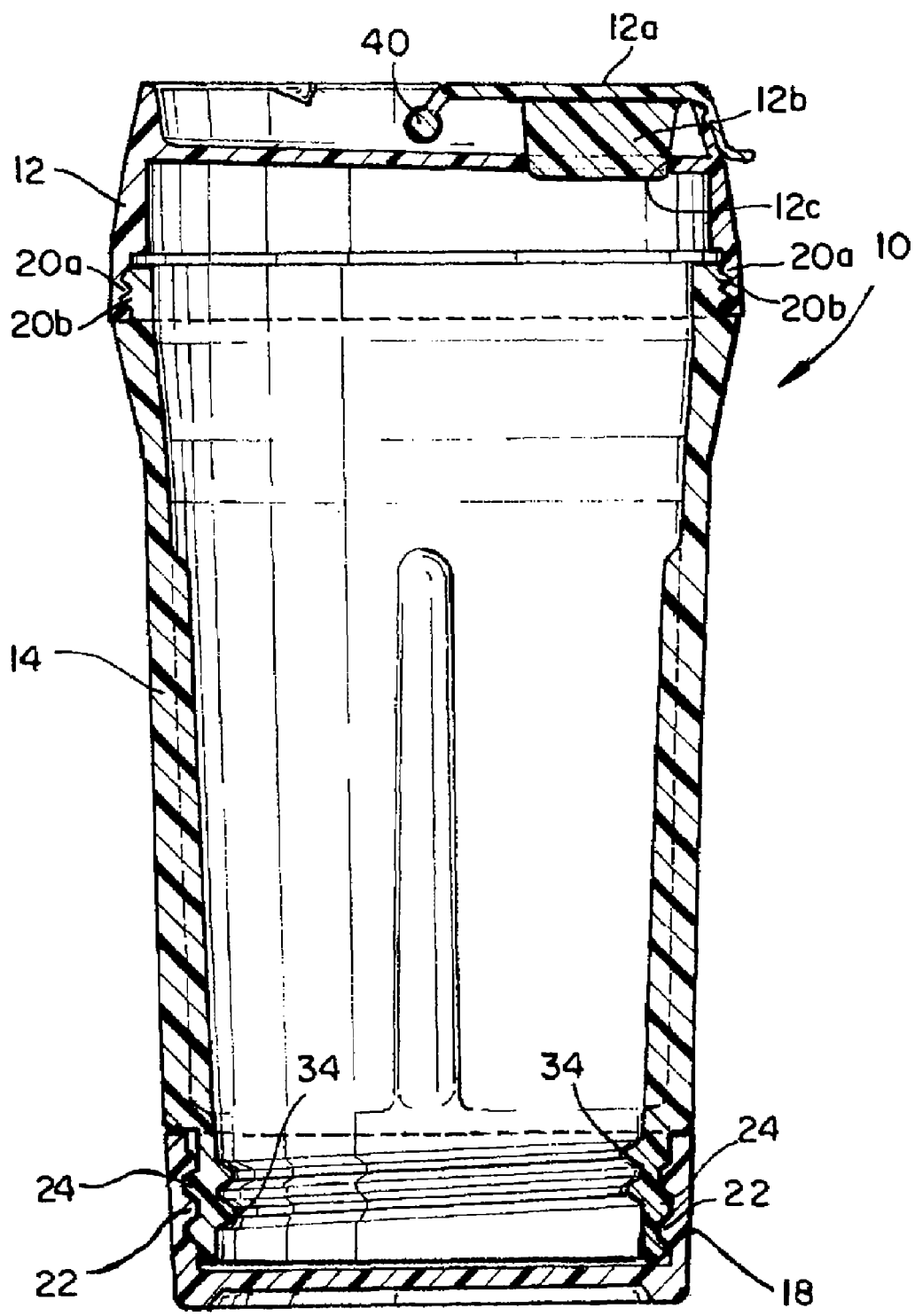
FIG. 7 is a cross-sectional elevation view of the travel mug shown in FIG. 2; taken along line 7-7 of FIG. 2.
Figure 8:
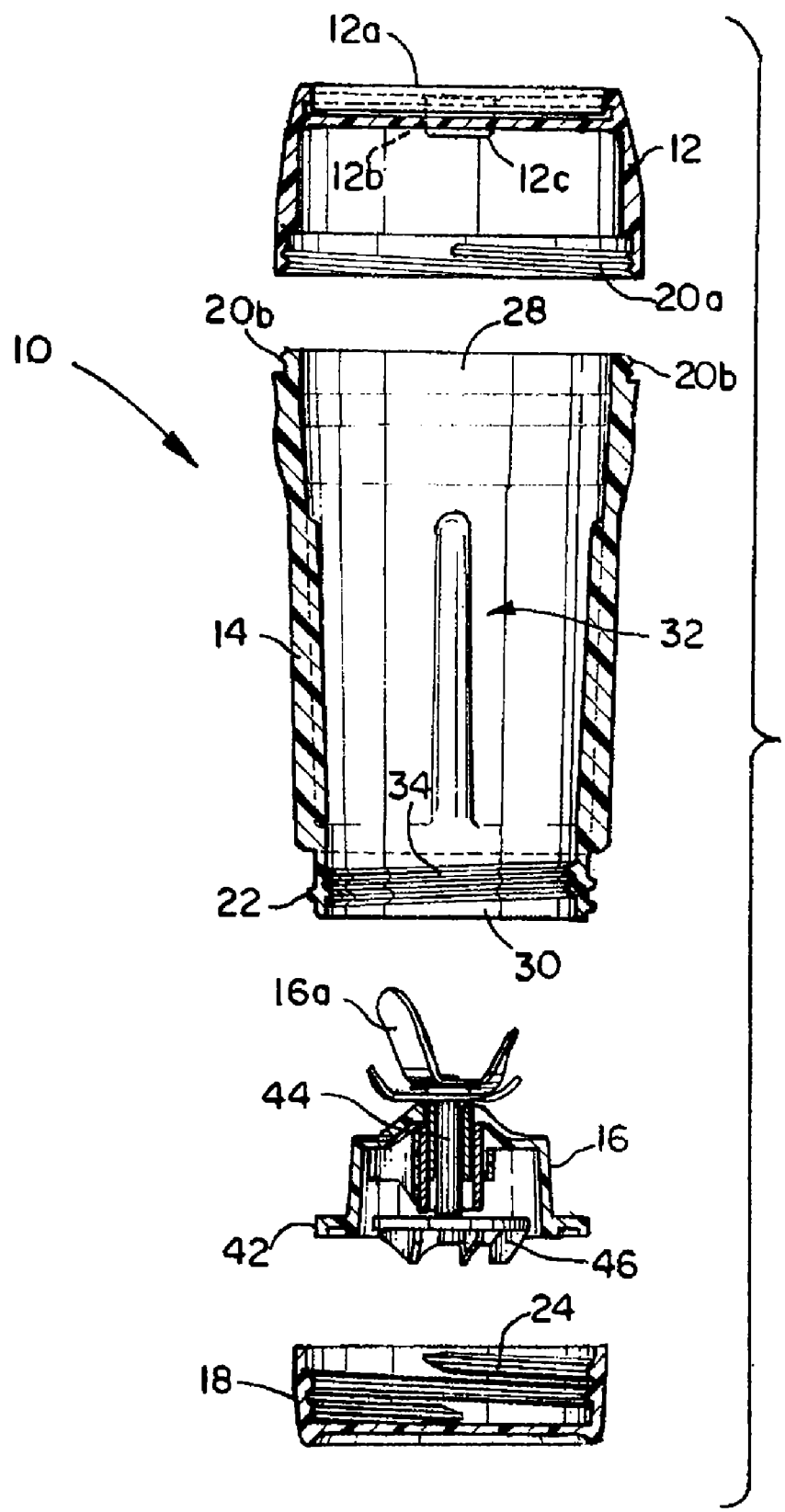
FIG. 8 is a cross-sectional exploded elevation view of the various components of the travel mug.
Figure 9:
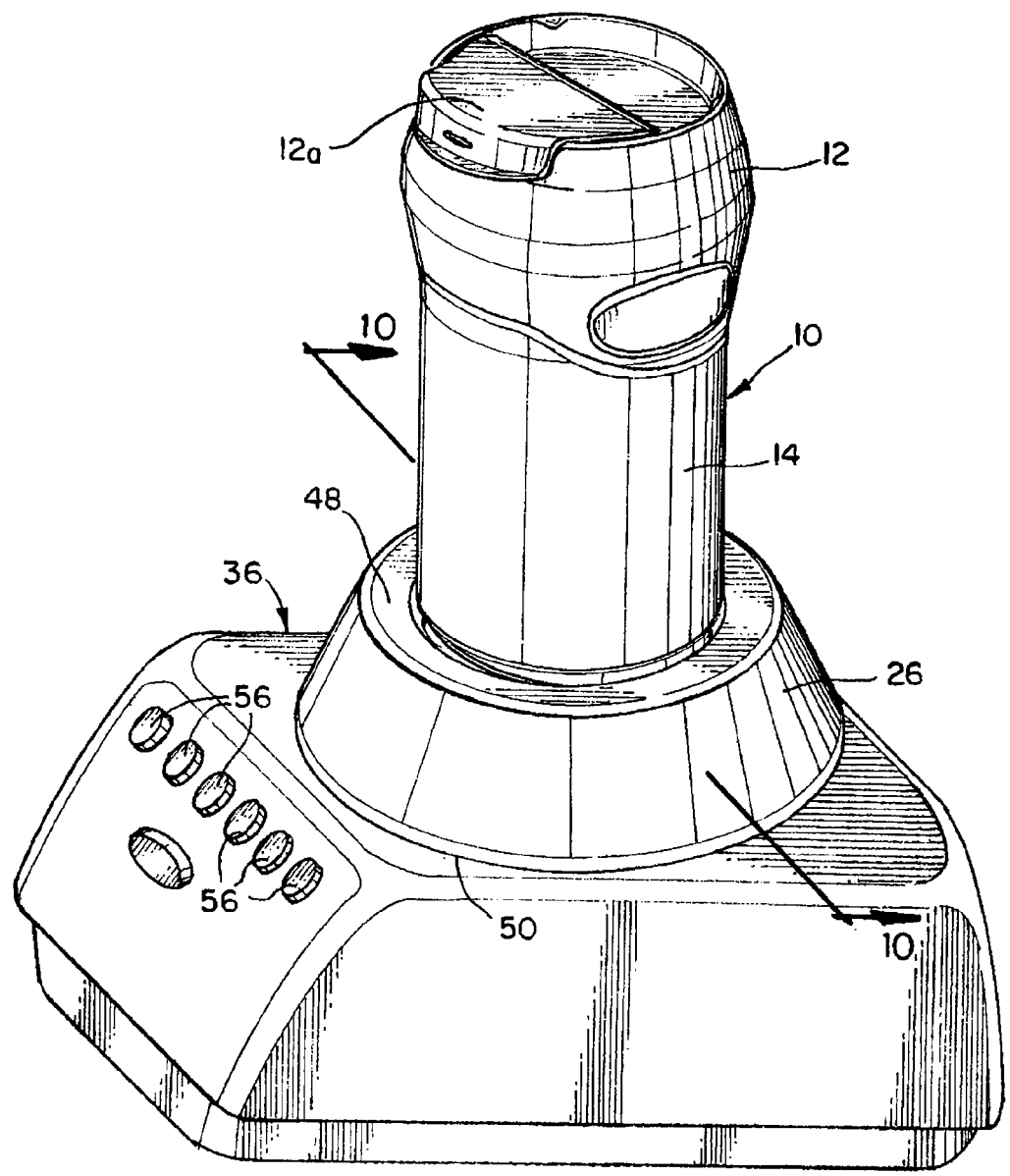
FIG. 9 is a perspective view of the travel mug mounted to a blender in a blending configuration.
Figure 10:
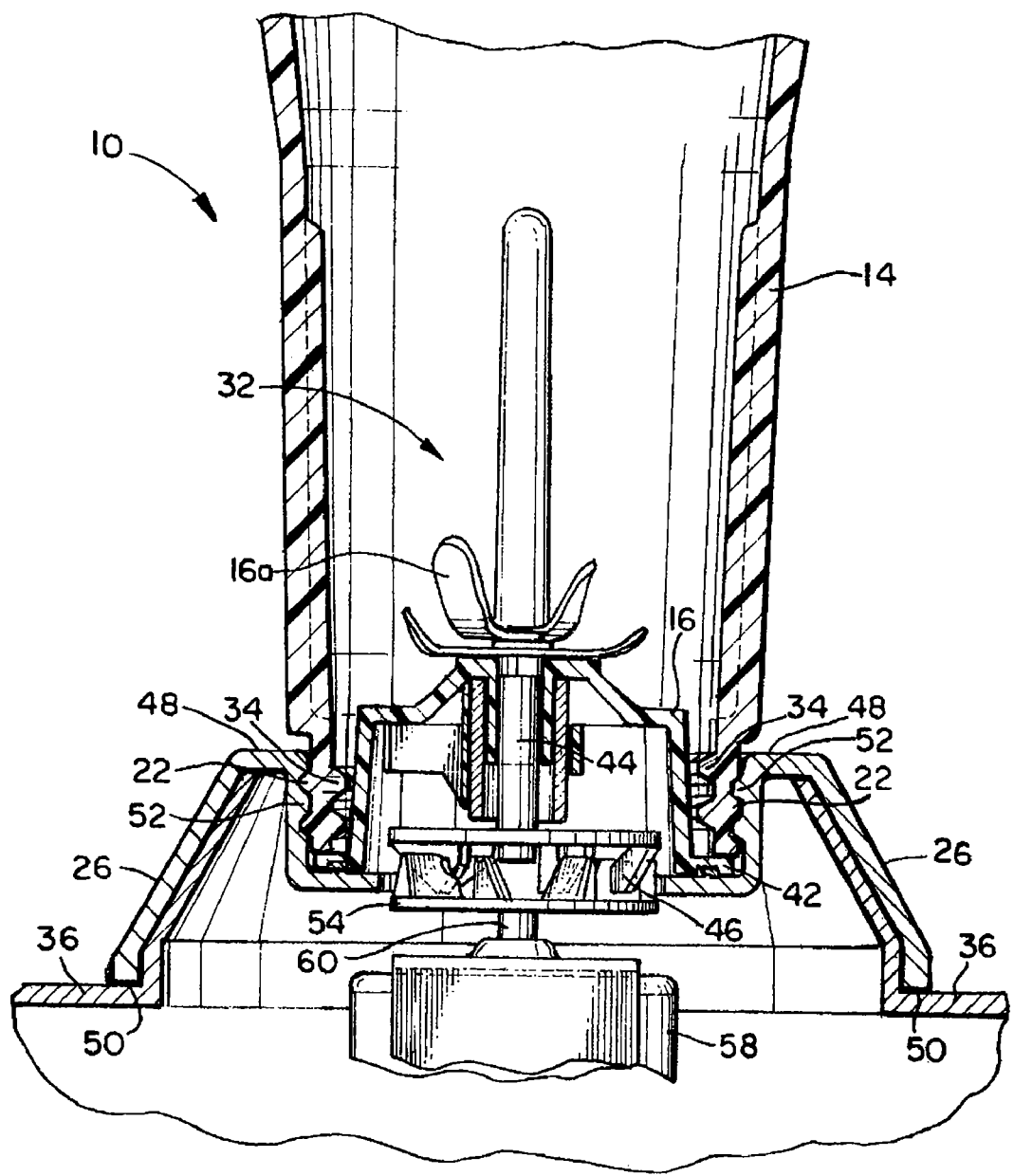
FIG. 10 is cross-sectional elevation view of the travel mug shown in FIG. 9, taken along line 10-10 of FIG. 9.

Referring now to the drawings in detail, wherein like numerals are used to indicate like elements throughout, there are shown in FIGS. 1-11 a travel mug, generally designated 10, configured to blend food (not shown). The travel mug 10 is preferably in the form of a conventional travel mug or travel cup, but could be other products such as a portable coffee cup, a water bottle, a sports bottle or any other container used to hold liquid or blended food. The travel mug 10 is adapted for being transported with a user in a drinking configuration (FIGS. 1-7) and for mounting to a blender 36 for blending food therein in a blending configuration (FIGS. 9 and 10). The travel mug 10 includes a cup body 14 for enclosing blended food or beverages. The cup body 14 has an open top 28, an open bottom 30 and a cavity 32 therein.

The cup body 14 is preferably generally tubular and formed of a high strength, lightweight insulating material, such as a polymeric material. However, it is understood by those skilled in the art that the shape and material used to construct the cup body 14 can be modified without departing from the spirit and scope of the invention. For example, the cup body 14 can be constructed of a metallic alloy or other such material that allows the cup body 14 to maintain an ergonomic and desired shape and that provides rigidity to the travel mug 10. Or, the cup body 14 can be constructed of Styrene Acrylonitrile (SAN) to allow the user to view the blended food or beverage inside the cup body 14. The bottom 30 of the cup body 14 includes outer threads 22 on an exterior surface of the cup body. Further, inner threads 34 are located on an interior surface at the bottom 30 of the cup body 14.

In the preferred embodiment, a drinking cap 12 is removably mounted to the top 28 of the cup body 14. The drinking cap 12 is preferably circular in form to engage the circular top 28 of the cup body 14. The drinking cap 12 is preferably formed of a high strength, lightweight material, such as a polymeric material. However, it is understood by those skilled in the art that the shape and material used to construct the drinking cap 12 can be modified without departing from the spirit and scope of the invention. For example, the drinking cap 12 can be virtually in the form of any shape that is capable of enclosing the top 28 of the cup body 14. Further, the drinking cap 12 can be formed of virtually any high strength, lightweight material, such as a metallic alloy or SAN, that allows a user to easily and conveniently consume blended food or blended liquid from within the cup body 14 and also prevents leakage of the blended food or blended beverage when the drinking cap 12 is mounted to the top 28 of the cup body 14. The drinking cap 12 includes threads 20a, on an interior surface of the drinking cap 12 to mate with threads 20b on an exterior surface of the top 28 of the cup body 14. The threaded connection 20a, 20b allows the drinking cap 12 to be removably mounted to the cup body 14.

In reference to FIGS. 1, 7 and 8, the drinking cap 12 includes a drinking hole 12c and a closure 12a movable between a sealing position wherein the closure 12a seals the drinking hole 12c and an open position where the closure 12a is spaced from the drinking hole 12c. The closure 12a pivots on the drinking cap 12. Specifically, a pivot pin 40 pivotally connects one end of the closure 12a to an outer periphery of the drinking cap 12 such that the closure 12a is able to be pivoted by the user from the open position to the sealing position and vice versa. A plug 12b extends from the closure 12a for selectively sealing the drinking hole. Specifically, the plug 12b extends into and tightly engages the drinking hole 12c when the closure 12a is in the sealing position.

In the preferred embodiment, the plug 12b is preferably formed of a rubber-like material and sized and shaped to be removable from within the drinking hole 12c, yet capable of being relatively easily removed from the drinking hole 12c. However, it is understood by those skilled in the art that the material used to construct the plug 12b and the size and shape of the plug 12b can be modified without departing from the spirit and scope of the invention. For example, the plug 12b can be constructed of a polymeric material or can be of varying shapes that can engage and can be removed from the drinking hole 12c by the user. The engagement of the plug 12b in the drinking hole 12c prevents blended food or beverages from leaking out of the drinking cap 12 when the travel mug 10 is inverted.

As shown in FIG. 1, in the preferred embodiment, a grip band 80 extends around the circumference of the drink cap 12. The grip band 80 allows the user to more securely hold the travel mug 10 when the drinking cap 12 is secured to the travel mug 10. A plurality of spaced apart holes (not shown) are located on the drinking cap 12 beneath the grip band 80. The grip band 80 also extends through the spaced apart holes into the interior of the drinking cap 12 to form an inner seal between the drinking cap 12 and cup body 14. The grip band 80 is preferably formed of rubber. However, it is understood by those skilled in the art that the grip band 80 can be formed of virtually any material, such as a polymeric material, that can create a proper seal between the drinking cap 12 and cup body 14 and that is also flexible enough to provide the user with a more secure grip on the travel mug 10. Further, at least one, but preferably two, tabs 86 are located on a top surface of the drinking cap 12. The closure 12a can be snapped and locked in an open position when the closure 12a engages the at least one tab 86.

Figure 11:
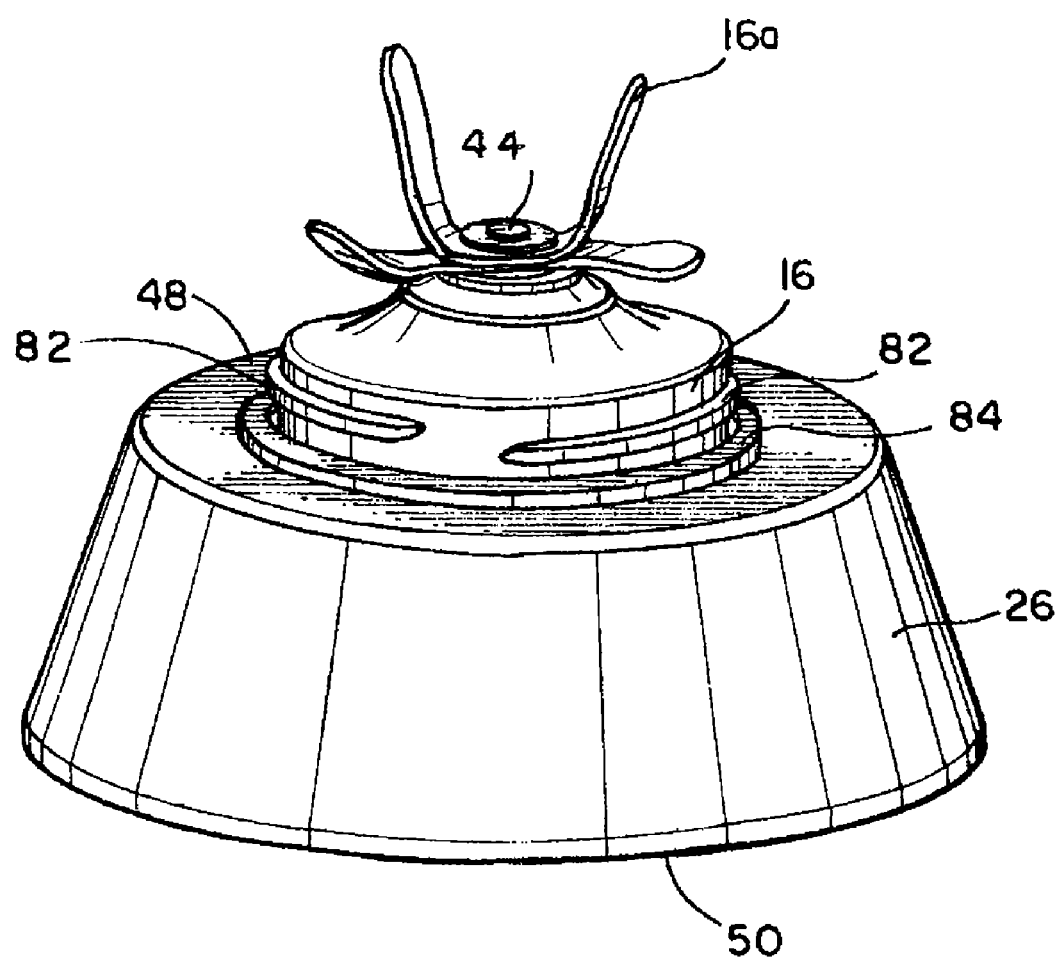
FIG. 11 is a front perspective view of an alternative embodiment of a blender collar and a blade fitting of the travel mug.

In reference to FIGS. 8, 10 and 11, a blade fitting 16 is removably mounted to the bottom 30 of the cup body 14 when the travel mug 10 is in the blending configuration. The blade fitting 16 includes a blending blade 16a that extends into the cavity 30 when the blade fitting 16 is mounted to the cup body 14 in the blending configuration. In the preferred embodiment, the blade fitting 16 is generally sized and shaped to extend into the open bottom 30 of the cup body 14. As shown in FIGS. 8 and 10, the blade fitting 16 is generally cylindrical in nature and has a flange 42 at a lower portion of the blade fitting 16 that abuts the lowest most portion of the cup body 14 when the travel mug 10 is in the blending configuration. However, it is understood by those skilled in the art that the size and shape of the blade fitting 16 can be modified without departing from the spirit and scope of the invention. For example, as shown in FIG. 11, the blade fitting 16 can have external threads 82 to mate with the inner threads 34 on the interior surface of the cup body 14. An O-ring 84 can be provided to properly seal the blade fitting 16 and a blender collar 26 to the cup body 14 when the travel mug 10 is in the blending configuration. It is understood by those skilled in the art that the blade fitting 16 can either be integrally formed with the blender collar 26 or removably attached to the blender collar 26.

The blade fitting 16 houses a connection shaft 44 which operatively connects the blending blade 16a at an upper portion of the blade fitting 16 to a coupling clutch 46 at a lower portion of the blade fitting 16. The coupling clutch 46 at the lower portion of the blade fitting 16 operatively connects the blending blade 16A to the blender 36. The blade fitting 16 is preferably formed of a high strength, light weight material, such as a polymeric material. However, it is understood by those skilled in the art that the material used to construct the blade fitting 16 can be modified without departing from the spirit and scope of the invention. For example, the blade fitting 16 can be constructed of virtually any material, such as a metallic alloy, that provides strength and stability to house and properly couple the blending blade 16A and the coupling clutch 46. The inner threads 34 at the bottom 30 of the cup body 14 allow a blade fitting 16 with external threads (not shown) to be mounted to the travel mug 10 when the travel mug 10 is in the blending configuration.

In reference to FIGS. 1, 7 and 8, a bottom closure 18 is removably mounted to the bottom 30 of the cup body 14 when the travel mug 10 is in the drinking configuration. The bottom closure 18 is preferably sized and shaped to enclose the bottom 30 of the cup body 14 when the travel mug 10 is in the drinking configuration. However, it is understood by those skilled in the art that the size and shape of the bottom closure 18 can be modified without departing from the spirit and scope of the invention. For example, the bottom closure 18 can be of virtually any shape or size that properly encloses the bottom 30 of the cup body 14.

The bottom closure 18 includes closure threads 24 on an interior surface of the bottom closure 18. The closure threads 24 of the bottom closure 18 threadingly engage the cup body 14. Specifically, the closure threads 24 threadingly engage the outer threads 22 on the exterior surface of the cup body 14 when the travel mug 10 is in the drinking configuration. However, it is understood by those skilled in the art that the bottom closure 18 can be removably mounted to the cup body 14 in a variety of manners that allow the bottom closure 18 to securely mount to the cup body 14 without departing from the spirit and scope of the invention. For example, the bottom closure 18 can be friction fitted onto the bottom 30 of the cup body 14 without the use of threads.

In reference to FIGS. 9, 10 and 11, the travel mug 10 further comprises the blender collar 26 removably mounted to the bottom 30 of the cup body 14 when the travel mug 10 is in the blending configuration. The blender collar 26 properly aligns the bottom 30 of the cup body 14 with the blender 36 when the travel mug 10 is in the blending configuration. The blender collar 26 of the preferred embodiment is preferably circular in nature with an open top end 48 and an open bottom end 50. The diameter of the open top end 48 is preferably smaller than the diameter of the open bottom end 50. In cross section, the sides of the blender collar 26 are sloped to connect the open top end 48 and the open bottom end 50.

In a preferred embodiment, as shown in FIG. 10, the blender collar 26 includes connection threads 52. The connection threads 52, which are proximate the upper open end 48 of the blender collar 26, allow the blender collar 26 to be removably mounted to the bottom 30 of the cup body 14. Specifically, the connection threads 52 of the blender collar 26 matingly engage the outer threads 22 on the exterior surface of the cup body 14 when the travel mug 10 is in the blending configuration. The blender collar 26 is preferably formed of a high strength, lightweight material, such as a polymeric material. However, it is understood by those skilled in the art that virtually any high strength, lightweight material, such as a metallic alloy of SAN, can be used without departing from the spirit and scope of the invention. Further, it is understood by those skilled in the art that the form and shape of the blender collar 26 can be modified without departing from the spirit and scope of the invention. For example, the blender collar 26 can be in virtually any shape or size that allows the bottom 30 of the cup body 14 to properly align with the blender 36 when the travel mug 10 is in the blending configuration.

In the preferred embodiment, the blender collar 26 is removably mounted to the bottom 30 of the cup body 14 to enclose and properly secure the blade fitting 16 to the cup body 14. However, it is understood by those skilled in the art that the connection between the blade fitting 16 and the bottom 30 of the cup body 14 can be modified such that the blender collar 26 is not needed to properly fasten the blade fitting 16 to the cup body 14. For example, as previously mentioned, the blade fitting 16 can include threads 82 on an exterior surface of the blade fitting 16 to secure the blade fitting 16 to the inner threads 34 on the interior surface of the cup body 14.

In reference to FIGS. 9 and 10, the preferred blender 36 rests on a countertop or tabletop (not shown) and has an upper opening to accept the bottom 30 of the travel mug 10. The upper opening of the blender 36 preferably has a clutch coupling 54 which operatively engages with the coupling clutch 46 of the blade fitting 16 when the travel mug 10 is in the blending configuration. In the preferred embodiment, the blender 36 is used to blend the food or beverage within the travel mug 10 can be in the form of virtually any household or kitchen blender. For example, the blender 36 can be in the form of a portable, hand-held blender capable of being carried with the user.

The blender 36 houses a motor 58 operatively connected to the clutch coupling 54 of the blender 36 by a drive shaft 60. A plurality of control buttons 56 of the blender 36 allow a user to control the speed and timing at which the blending blades 16a rotate within the travel mug 10 when the travel mug 10 is in the blending configuration. It is understood by those skilled in the art that the type and form of blender 36 used to blend the food within the travel mug 10 can be modified without departing from the spirit and scope of the invention.

In operation, a user may be required to assemble the components of the travel mug 10 to create the drinking configuration or the blending configuration. To blend food or beverages within the travel mug 10, the user may removably mount the blade fitting 16 to the open bottom 30 of the cup body 14. In the preferred embodiment, the flange 42 of the blade fitting 16 abuts the lowest most portion of the cup bottom 14. Further, the blender collar 26 is threadingly engaged to the bottom 30 of the cup bottom 14 to enclose the blending blade 16 therein. However, as previously mentioned, it is within the spirit and scope of the invention to provide threads on the blade fitting 16 to securely mount the blade fitting 16 to the cup body 14 without the need of the blender collar 26.

Next, the user may insert food, a beverage or ingredients to be mixed through the open top 28 and into the cavity 32 of the cup body 14. Then, the user may removably engage the drinking cap 12 to the top 28 of the cup body 14. The drinking cap 12 is removably engaged via the threads 20a, 20b. Next, the user may position the cup body 14, with the drinking cap 12 and blade fitting 16 mounted thereon, onto the blender 36 such that the blending blade 16a operatively engages the motor 58 of the blender 36. Specifically, the travel mug 10 is placed onto the blender 36 such that the coupling clutch 46 of the blade fitting 16 operatively engages the coupling clutch 54 of the blender 36. Next, the user may activate the blender 36 to blend the food, beverage or ingredients.

Once the user has blended the food or mixed beverage to a desired amount via the control buttons 56 on the blender 36, the user may remove the travel mug 10 from the blender 36. The user would remove the travel mug 10 in a vertical motion from the blender 36. Next, the user may invert the travel mug 10 such that the drinking cap 12 is now underneath the cup body 14 and the blade fitting 16 is above the cup body 14. The user may then remove the blade fitting 16 from the bottom 30 of the cup body 14. In this position, the plug 12b of the drinking cap 12 acts as seal within the drinking hole 12c to prevent the blended food or mixed beverage from escaping from the top 28 of the travel mug 10. Now, the user may removably engage the bottom closure 18 to the bottom 30 of the cup body 14 to sealingly engage the bottom 30 of the cup body 14. Then, the travel mug 10 may be inverted to the normal transporting position (FIG. 1).

When the user desires to drink the blended food or mixed beverage, the user may pivot the closure 12a to the open position to unseal the drinking hole 12a. At this position, the user is able to consume the blended food or beverage. It is understood by those skilled in the art that the method used to blend food or mixed beverages within the travel mug 10 can be modified without departing from the spirit and scope of the invention. For example, the user does not have to attach the bottom closure 18 to the bottom 30 of the cup body 14 to consume the blended food or mixed beverage from the travel mug 10. Alternatively, a user could consume the blended food or mixed beverage from the travel mug 10 through the drinking cap 12 while the blending blade 16 is removably mounted to the bottom 30 of the cup body 14.

It will be appreciated by those skilled in the art that changes could be made to the embodiment described above without departing from the broad inventive concept thereof. It is understood, therefore, that this invention is not limited to the particular embodiment disclosed, but is intended to cover modifications within the spirit and scope of the present invention as defined by the appended claims.

We claim:

1. A travel mug configured to blend food, said travel mug adapted for being transported with a user in a drinking configuration and for mounting to a blender for blending food therein in a blending configuration, said mug comprising:
    a) a cup body having an open top, an open bottom and a cavity therein;
    b) a drinking cap removably mounted to said top of said cup body, said drinking cap including a drinking hole and a closure movable between a sealing position wherein said closure seals said drinking hole and an open position where said closure is spaced from said drinking hole;
    c) a blade fitting removably mounted to said bottom of said cup body when said travel mug is in said blending configuration, said blade fitting including a blending blade extending into said cavity when said blade fitting is mounted to said cup body in said blending configuration; and
    d) a bottom closure removably mounted to said bottom of said cup body when said travel mug is in said drinking configuration.

2. The mug in accordance with claim 1, wherein said closure pivots on said drinking cap and includes a plug which extends from said closure for selectively sealing said drinking hole.

3. The mug in accordance with claim 2, wherein said plug extends into and engages said drinking hole when said closure is in said sealing position, the engagement of said plug in said drinking hole preventing food from leaking out of said drinking cap when said travel mug is inverted.

4. The mug in accordance with claim 2, said drinking cap further includes at least one tab, wherein said closure can be locked in said open position when said closure engages said at least one tab.

5. The mug in accordance with claim 1, wherein said bottom of said cup body includes outer threads on an exterior surface of said cup body and inner threads on an interior surface of said cup body; said outer threads engaging with threads of said bottom closure when said travel mug is in said drinking configuration and said inner threads allowing said bottom of said cup body to be mounted to said blade fitting when said travel mug is in said blending configuration.

6. The mug in accordance with claim 5, further comprising a blender collar removably mounted to said bottom of said cup body when said travel mug is in said blending configuration; said blender collar properly aligning said bottom of said cup body with said blender when said travel mug is in said blending configuration.

7. The mug in accordance with claim 1, wherein said drinking cap and said bottom closure threadingly engage said cup body.

8. A method of blending food using a travel mug, the method comprising the steps of:
    a) providing a travel mug comprising a cup body having an open top, an open bottom and a cavity therein;
    b) removably mounting a blade fitting, having a blender blade, to said bottom of said cup body;
    c) inserting food through said open top and into said cavity of said cup body;
    d) removably engaging a drinking cap, having a sealable drinking hole, to said top of said cup body;
    e) positioning said travel mug onto a blender such that said blending blade operatively engages said blender;
    f) activating said blender to blend said foodstuff;
    g) removing said travel mug from said blender;
    h) inverting said travel mug and removing said blade fitting from said bottom of said cup body;
    i) removably engaging a bottom closure to said bottom of said cup body; and
    j) inverting said travel mug and unsealing said drinking hole to consume said blended food.

* * * * *